United States Patent
Guilbaud et al.

(10) Patent No.: US 9,581,067 B2
(45) Date of Patent: Feb. 28, 2017

(54) EXHAUST SYSTEM MIXER WITH IMPACTOR

(71) Applicants: Faurecia Emissions Control Technologies, USA, LLC, Columbus, IN (US); Frederic Guilbaud, Montbeliard (FR); Philip M. Dimpelfeld, Columbus, IN (US); Eduardo Alano, Columbus, IN (US)

(72) Inventors: Frederic Guilbaud, Montbeliard (FR); Philip M. Dimpelfeld, Columbus, IN (US); Eduardo Alano, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 17 days.

(21) Appl. No.: 14/431,340

(22) PCT Filed: Sep. 28, 2012

(86) PCT No.: PCT/US2012/057768
§ 371 (c)(1),
(2) Date: Mar. 26, 2015

(87) PCT Pub. No.: WO2014/051605
PCT Pub. Date: Apr. 3, 2014

(65) Prior Publication Data
US 2015/0240689 A1  Aug. 27, 2015

(51) Int. Cl.
*F01N 3/00* (2006.01)
*F01N 3/28* (2006.01)
(Continued)

(52) U.S. Cl.
CPC ............ *F01N 3/28* (2013.01); *B01F 3/04049* (2013.01); *B01F 5/0268* (2013.01);
(Continued)

(58) Field of Classification Search
CPC .......... F01N 3/28; F01N 3/2066; F01N 3/035; F01N 3/2892; F01N 13/10; B01F 5/0268; B01F 5/0473; B01F 5/0614; B01F 3/04049
(Continued)

(56) References Cited

U.S. PATENT DOCUMENTS 7,448,206 B2 * 11/2008 Meingast ............ B01F 3/04049
                                                     239/433
8,646,258 B2    2/2014 Vanvolsem et al.
(Continued)

FOREIGN PATENT DOCUMENTS

WO    2010146412    12/2010
WO    2011069030     6/2011

OTHER PUBLICATIONS

International Preliminary Report on Patentability for PCT Application No. PCT/US2012/057768, mailed Apr. 9, 2015.

*Primary Examiner* — Thomas Denion
*Assistant Examiner* — Kelsey Stanek
(74) *Attorney, Agent, or Firm* — Carlson, Gaskey & Olds, PC

(57) ABSTRACT

A mixer for a vehicle exhaust system includes an outer shell having an inlet end and an outlet end, an upstream baffle positioned adjacent the inlet end to initiate swirling of engine exhaust gases, and a downstream baffle positioned adjacent the outlet end. An impactor extends between the upstream and downstream baffles, and is spaced radially inwardly from an inner surface of the outer shell by a gap.

21 Claims, 6 Drawing Sheets

(51) Int. Cl.

| | | |
|---|---|---|
| *F01N 3/20* | (2006.01) | |
| *F01N 3/035* | (2006.01) | |
| *B01F 5/02* | (2006.01) | |
| *B01F 5/04* | (2006.01) | |
| *B01F 5/06* | (2006.01) | |
| *B01F 3/04* | (2006.01) | |
| *F01N 13/10* | (2010.01) | |

(52) U.S. Cl.
CPC .......... *B01F 5/0473* (2013.01); *B01F 5/0614* (2013.01); *F01N 3/035* (2013.01); *F01N 3/2066* (2013.01); *F01N 3/2892* (2013.01); *F01N 13/10* (2013.01); *F01N 2240/20* (2013.01); *F01N 2610/1453* (2013.01); *Y02T 10/24* (2013.01)

(58) Field of Classification Search
USPC .................................................. 60/272–324
See application file for complete search history.

(56) References Cited

U.S. PATENT DOCUMENTS

| | | | |
|---|---|---|---|
| 2011/0131958 A1 | 6/2011 | Adelman et al. | |
| 2011/0239631 A1* | 10/2011 | Bui ....................... | F01N 3/2066 60/295 |
| 2012/0204541 A1* | 8/2012 | Li ....................... | B01F 3/04049 60/274 |
| 2012/0216513 A1* | 8/2012 | Greber ................. | F01N 3/2066 60/295 |
| 2013/0263575 A1* | 10/2013 | Sun ........................ | F01N 11/00 60/274 |

\* cited by examiner

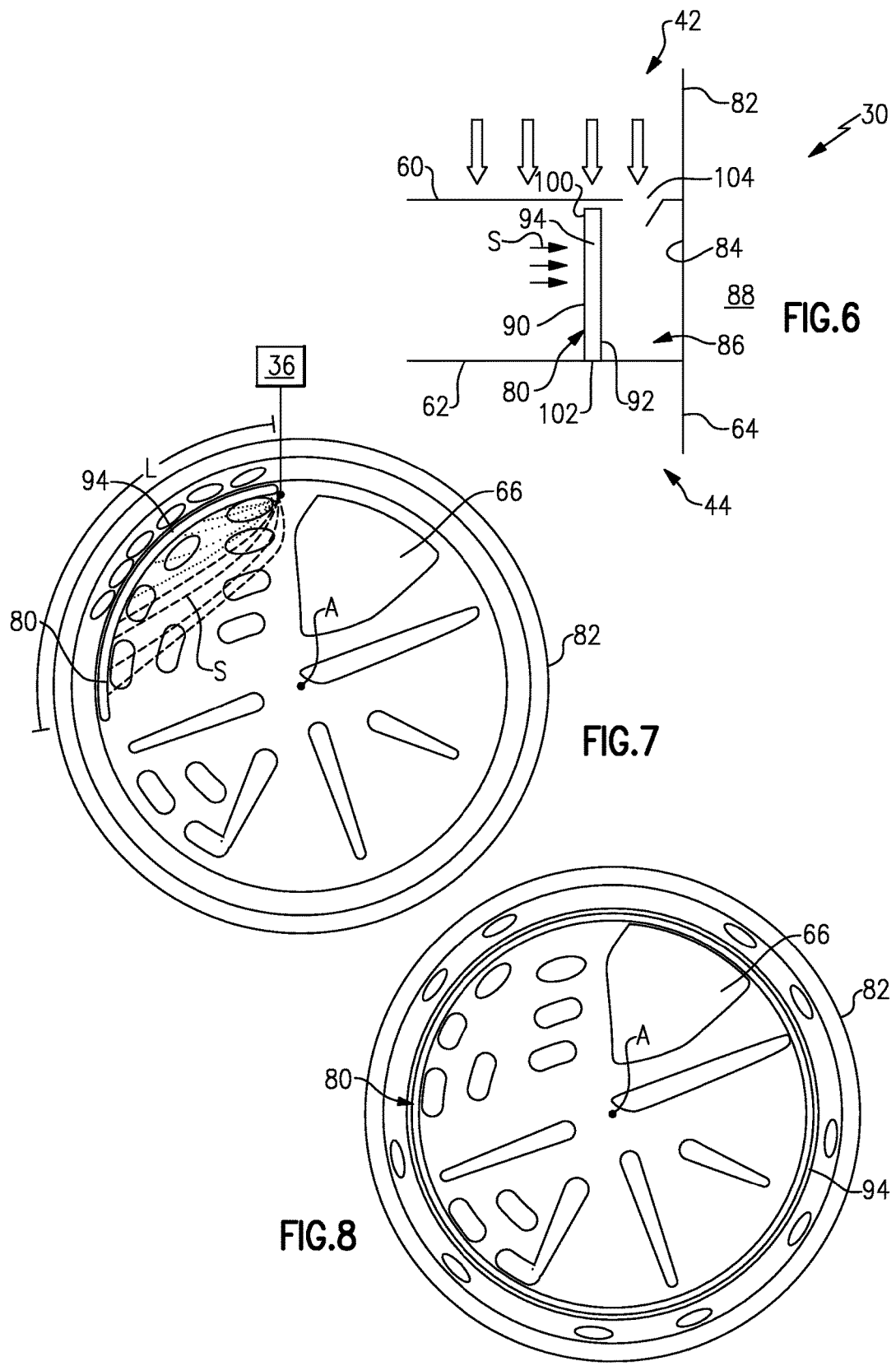

US 9,581,067 B2

EXHAUST SYSTEM MIXER WITH IMPACTOR

BACKGROUND OF THE INVENTION

An exhaust system conducts hot exhaust gases generated by an engine through various exhaust components to reduce emissions and control noise. The exhaust system includes an injection system that injects a reducing agent, such as a solution of urea and water for example, upstream of a selective catalytic reduction (SCR) catalyst. A mixer is positioned upstream of the SCR catalyst and mixes engine exhaust gases and products from urea transformation.

The injector typically sprays the urea into the exhaust stream. The spray makes contact with the mixer and surrounding walls which have been heated by the exhaust gases. As droplets of the urea contact these heated structures, the surfaces cool down which favors a local formation of urea deposits. These deposits can adversely affect flow circulation and operating efficiency.

SUMMARY OF THE INVENTION

In one exemplary embodiment, a mixer for a vehicle exhaust system includes an outer shell having an inlet end and an outlet end, an upstream baffle positioned adjacent the inlet end to initiate swirling of engine exhaust gases, and a downstream baffle positioned adjacent the outlet end. An impactor extends between the upstream and downstream baffles, and is spaced radially inwardly from an inner surface of the outer shell by a gap.

In a further embodiment of the above, the outer shell defines a central axis extending along a length of the mixer, and wherein the impactor comprises an arcuate wall that is defined by a circumferential length that extends to at least partially surround the central axis In a further embodiment of any of the above, the arcuate wall has an upstream edge adjacent the upstream baffle and a downstream edge adjacent the downstream baffle, and wherein one of the upstream and downstream edge is fixed to a respective one of the upstream and downstream baffles, and wherein the other of the upstream and downstream edge is movable relative to the respective other of the upstream and downstream baffles in order to accommodate thermal expansion.

In a further embodiment of any of the above, the gap forms an isolation channel between the outer shell and the impactor, and wherein the upstream baffle includes at least one hole that directs engine exhaust gases into the isolation channel.

In one exemplary embodiment, a vehicle exhaust system includes a first exhaust component having an inlet to receive engine exhaust gases, a second exhaust component positioned downstream of the first exhaust component, and a mixer positioned downstream of the first component and upstream of the second exhaust component. The mixer has an inlet end configured to receive engine exhaust gases exiting the first exhaust component and an outlet end to direct swirling engine exhaust gas to the second exhaust component. The mixer includes an outer shell extending from the inlet end to the outlet end, an upstream baffle positioned adjacent the inlet end to initiate swirling of engine exhaust gases, a downstream baffle positioned adjacent the outlet end, and a wall extending between the upstream and downstream baffles. The wall has an outer peripheral surface that is spaced radially inwardly from an inner surface of the outer shell by a gap.

In a further embodiment of any of the above, the first exhaust component comprises a diesel oxidation catalyst and/or particulate filter and the downstream component comprises a selective catalytic reduction catalyst or a catalyst which combines selective catalyst reduction and particulate filter functions.

These and other features of this application will be best understood from the following specification and drawings, the following of which is a brief description.

BRIEF DESCRIPTION OF THE DRAWINGS

FIG. 6 is a schematic view of a mixer with an impactor.

FIG. 7 is a schematic representation of one impactor configuration.

FIG. 8 is a schematic representation of another impactor configuration.

DETAILED DESCRIPTION

Figure 1:
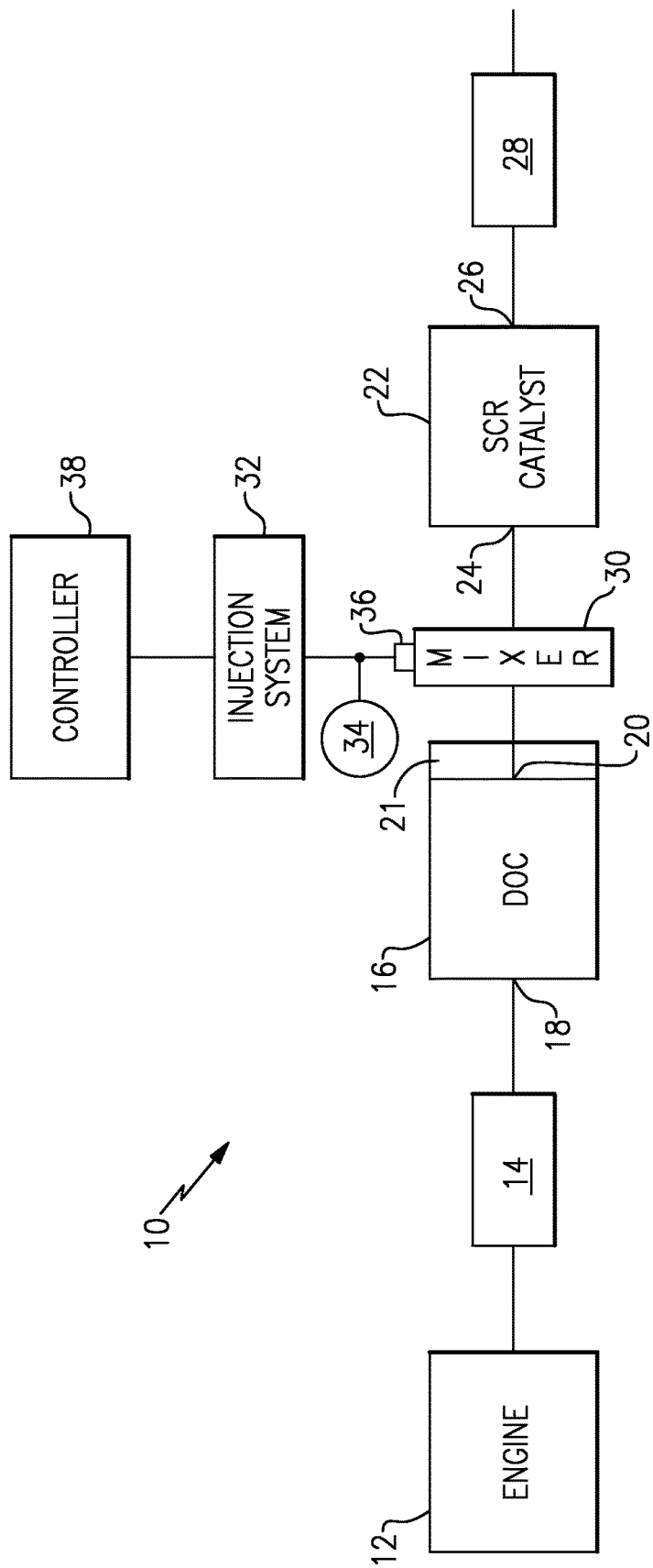
FIG. 1 schematically illustrates one example of an exhaust system with a mixer according to the subject invention.
Figure 2:
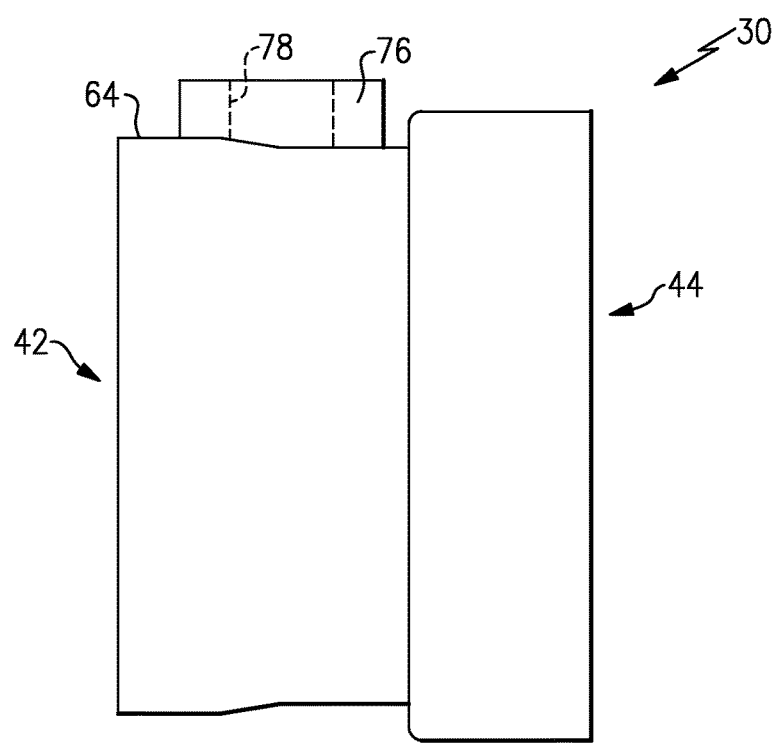
FIG. 2 is a side view in partial section of the mixer of FIG. 1.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc. In one example, configuration, the upstream exhaust components 14 direct exhaust gases into a diesel oxidation catalyst (DOC) 16 having an inlet 18 and an outlet 20. Downstream of the DOC 16 may be a diesel particulate filter (DPF) 21. The DPF 21 is used to remove contaminants from the exhaust gas as known. Downstream of the DOC 16 and DPF 21 is a selective catalytic reduction (SCR) catalyst 22 having an inlet 24 and an outlet 26. Optionally, component 22 can comprise a catalyst that is configured to perform a selective catalytic reduction function and a particulate filter function. The outlet 26 communicates exhaust gases to downstream exhaust components 28. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 (or outlet of the DPF 21) and upstream of the inlet 24 of the SCR catalyst 22. The mixer 30 is used to generate a swirling or rotary motion of the exhaust gas. Any type of mixing element can be used, such as that set forth in U.S. 2012/0216513 for example, which is assigned to the assignee of the present invention and is herein incorporated by reference.

An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, an injector 36, and a controller 38 that controls injection of the urea as known.

Figure 3:
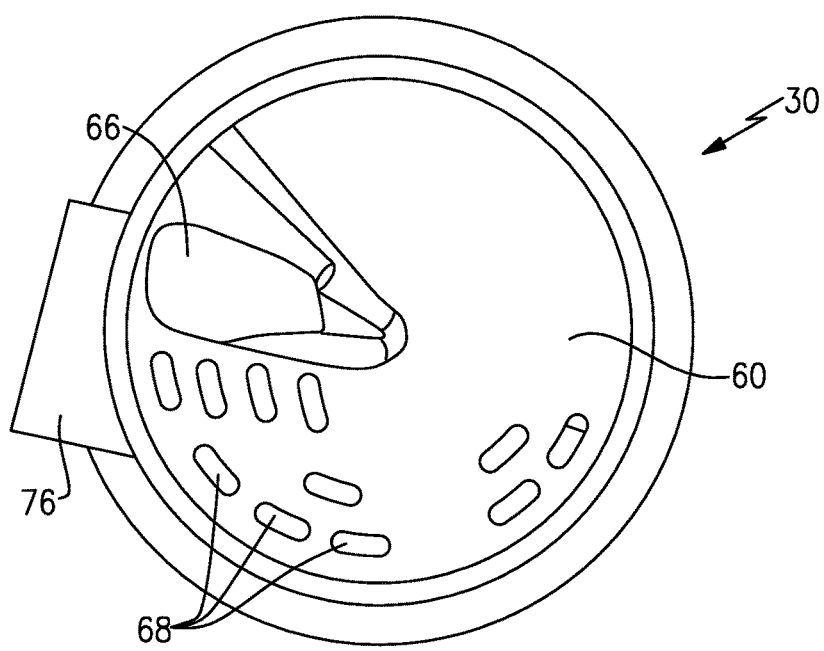
FIG. 3 is an inlet end view of the mixer of FIG. 2.
Figure 4:
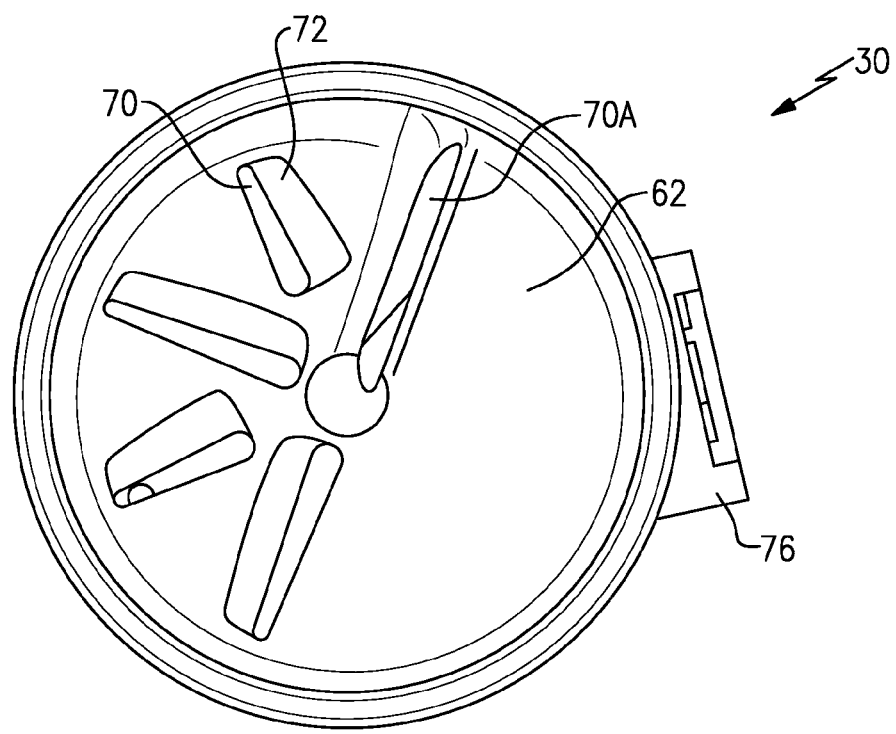
FIG. 4 is a perspective outlet end view of the mixer of FIG. 2.
Figure 5:
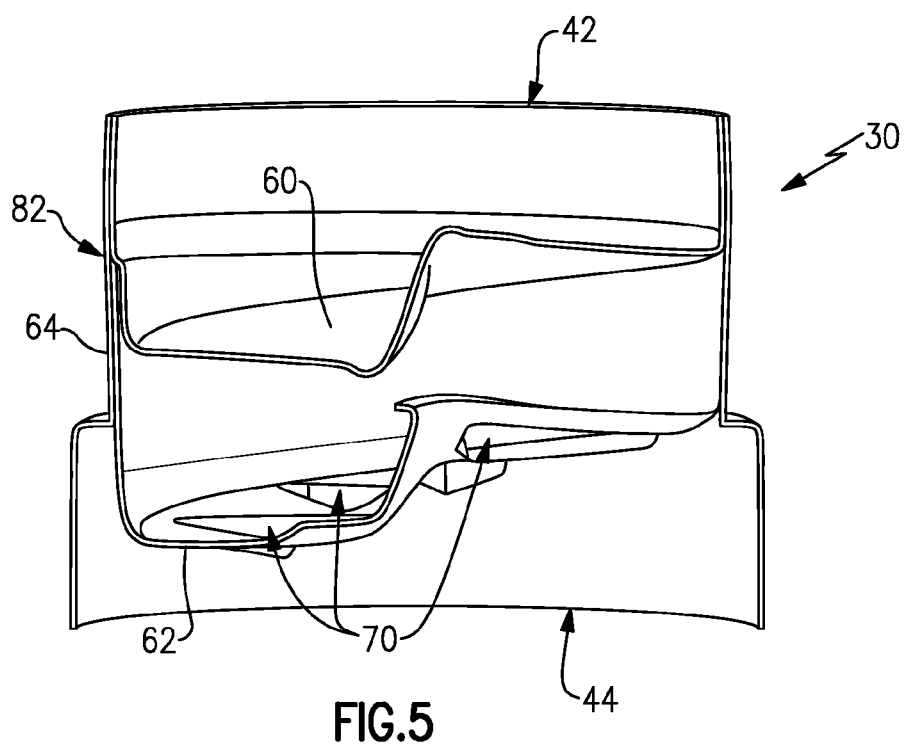
FIG. 5 is a top view of the mixer of FIG. 2.

The mixer 30 is shown in greater detail in FIGS. 2-5. The mixer 30 comprises a mixer body having an inlet end 42 (FIG. 2) configured to receive the engine exhaust gases and an outlet end 44 to direct a mixture of swirling engine exhaust gas and products transformed from urea to the SCR catalyst 22. As shown in FIGS. 3-5, the mixer body includes an upstream baffle 60 and a downstream baffle 62 that are surrounded by an outer shell 82 defining an outer peripheral surface 64. The upstream baffle 60 at the inlet 42 includes a large opening 66 (FIG. 3) that receives the majority of the exhaust gas (receives at least 60% of the exhaust mass flow rate) and which is configured to initiate the swirling motion. The upstream baffle 60 also includes a plurality of perforations 68 that ensure optimal homogenization of exhaust gases and reduces back pressure. The downstream baffle 62 includes a plurality of openings 70 and deflector portions 72 through which the exhaust gas exits. The main exit of the mixture is through the largest opening 70A. Additional details regarding the operation of the upstream 60 and downstream baffles 62 can be found in U.S. 2012/0216513.

The outer peripheral surface 64 of the mixer body includes an injector boss 76 having an opening 78 to receive the injector 36. The opening 78 is generally positioned between the upstream 60 and downstream 62 baffles such that urea is sprayed into a swirling gas flow that is initiated by the upstream baffle 60.

FIGS. 6-10 show an example where the mixer 30 includes an impactor 80 that reduces the risk of urea deposit formation. As schematically shown in FIG. 6, the mixer 30 has an outer shell 82 defining outer peripheral surface 64 and extending from the inlet end 42 to the outlet end 44. The impactor 80 extends between the upstream 60 and downstream 62 baffles and is spaced radially inwardly from an inner surface 84 of the outer shell 82 by a gap 86. The gap 86 forms an isolation channel between the impactor 80 and the outer shell 82 that prevents urea spray from directly contacting the outer shell 82.

Figure 11:
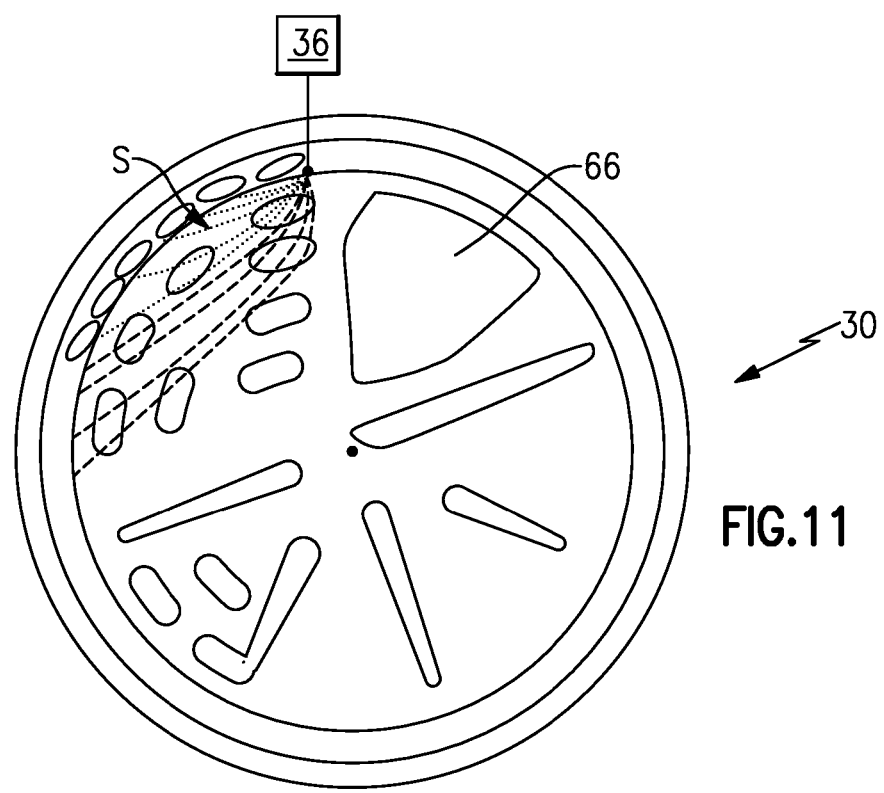
FIG. 11 is a view showing spray deflected by exhaust gas flow.

The outer peripheral surface 64 is exposed to the cooler temperatures of the external environment 88. In prior configurations, as urea droplets contacted the outer shell they cooled the outer shell, which promoted the formation of a liquid film. The liquid film is the precursor of deposit formation. In the subject invention, the impactor 80 is positioned such that the urea spray S contacts the impactor 80 before contacting the outer shell 82. FIG. 11 shows the spray pattern S as it is injected into the swirling exhaust gas flow by the injector which is schematically shown at 36. As shown in FIG. 6, the impactor 80 is exposed to heated exhaust gases on both an inner surface 90 and an outer surface 92. Thus, the impactor 80 is maintained at a higher temperature than the outer shell 82, and therefore when the urea spray S contacts the impactor 80 the formation of urea deposits is reduced significantly.

The impactor 80 should be positioned such that it is close enough to the outer shell 82 such that the spray area is of sufficient size to promote thorough mixing with the swirling exhaust gas. Additionally, the impactor 80 should be positioned at a sufficient distance from the outer shell 82 such that the impactor 80 remains at a more elevated temperature due to exposure to heated exhaust gases from the isolation channel. In one example, the gap 86 is within a range of approximately 10 to 15 millimeters.

As shown in FIGS. 7-8, the outer shell 82 defines a mixer center A at a central axis that extends along a length of the mixer 30. In one example, the impactor 80 comprises an arcuate or curved wall 94 that is defined by a circumferential length L that extends around a portion of the central axis A starting from the injector 36. In the example shown in FIG. 8, the wall 94 has a circumferential length that extends 360 degrees around the central axis A from the injector 36 to form a complete annular ring. In the example shown in FIG. 7, the wall 94 extends less than 180 degrees around the central axis A, and specifically shows the wall 94 extending approximately 90 degrees around the center axis A from the injector 36. It should be understood that the wall 94 can be formed to have various circumferential lengths; however, the wall 94 should be positioned to extend around the center axis A by at least 90 degrees from the injector 36 to have the most beneficial effect.

As discussed above, the upstream baffle 60 includes a large opening 66 that is bigger than the other openings in the baffle 60. The arcuate wall 94 is positioned adjacent to an edge of the large opening 66 such that when the urea spray S is injected it is mixed with a significant amount of swirling exhaust gas and the droplets contact the wall 94 prior to contacting the outer shell 82.

As shown in FIG. 6, the wall 94 has an upstream edge 100 adjacent the upstream baffle 60 and a downstream edge 102 adjacent the downstream baffle 62. The downstream edge 102 is fixed to the downstream baffle 62, such as by welding or brazing for example. The upstream edge 100 is movable relative to the upstream baffle 60, i.e. the upstream edge 100 is not fixed to the upstream baffle 60, in order to accommodate thermal expansion. Thus, there is a small clearance that is provided between the upstream baffle 60 and the upstream edge 100 of the wall 94. The reverse mounting could also be used with the upstream edge 100 being fixed to the upstream baffle 60 and the downstream edge 102 being moveable to the downstream baffle 62.

Figure 10:
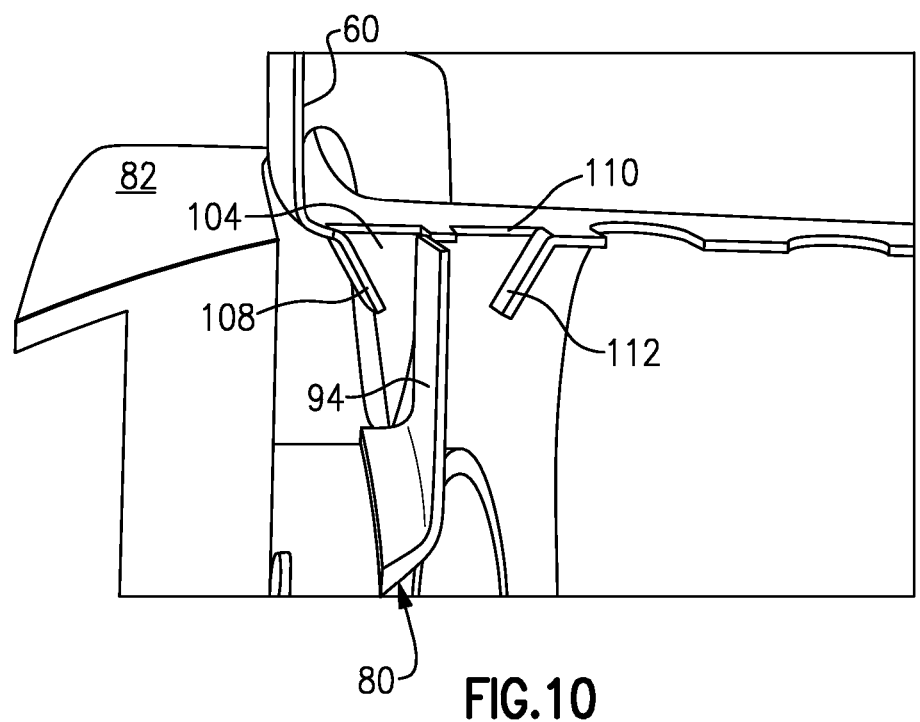
FIG. 10 is a sectional view of the outer wall, impactor, and upstream baffle.

As discussed above, the gap 86 forms an isolation channel between the outer shell 82 and the impactor 80. As shown in FIGS. 6 and 10, the upstream baffle 60 includes one row of holes 104 and one row of holes 110 that direct engine exhaust gases into the isolation channel. This facilitates maintaining the wall 94 at an elevated temperature as compared to the outer shell 82. The holes 104 and 110 are shaped to direct the exhaust gas toward the wall 94. The shape and number of holes 104 and 110 should be adjusted as needed to provide good flow circulation.

Figure 9A:
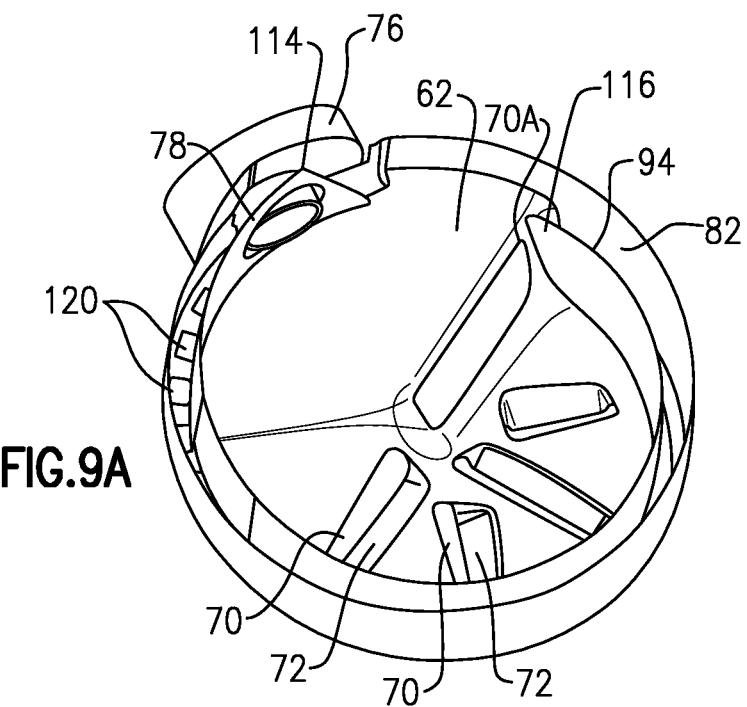
FIG. 9A is a perspective view showing an outer shell, downstream baffle, and impactor.

The upstream baffle 60 includes a row of holes 104 adjacent the outer surface 92 of the wall 94. In one example, a deflector portion 108 (FIG. 10) is formed adjacent an edge of the hole 104 to facilitate directing the engine exhaust gases against the outer surface 92 of the wall 94. The exhaust gas exits the isolation channel via holes 120 (FIG. 9A). The upstream baffle includes one row of holes 110 adjacent the inner surface 90 of the wall 94. The upstream baffle 60 includes a deflector portion 112 formed adjacent an edge of the hole 110 that is immediately adjacent the wall 94 to facilitate directing the engine exhaust gases against the inner surface 90 of the wall 94. In addition to heating up the wall 94, the holes 110 create an exhaust gas curtain to reduce droplet impingement.

Figure 9B:
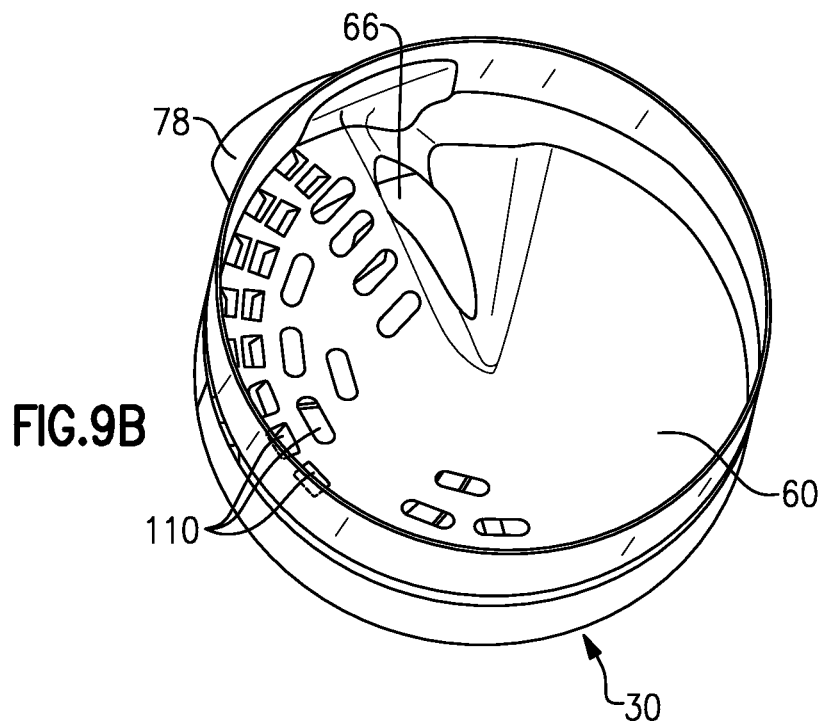
FIG. 9B is similar to FIG. 9A but additionally includes the upstream baffle.

FIG. 9A shows the wall 94 positioned within the downstream baffle 62 and FIG. 9B shows the upstream baffle 60 installed on the assembly shown in FIG. 9A. The large opening 66 is configured to direct a substantial portion of the engine exhaust gases inside the mixer to initiate the swirling motion and promote thorough mixing.

In the example shown in FIG. 9A, the wall 94 includes a locating portion 114 that fits around the injector boss 76. In this example, the inner surface 84 of the outer shell 82 surrounds a substantial portion of the arcuate wall 94, and the wall 94 terminates at a distal end 116. The distal end 116 is positioned adjacent the largest opening 70A in the downstream baffle 62 where a majority of the urea and exhaust gas mixture exit the mixer 30.

The subject mixer 30 with the impactor 80 is positioned to be exposed to hot exhaust gases on both the inner surface 90 and outer surface 92. This maintains the impactor 80 at a higher temperature than the outer shell 82 such that when urea droplets contact the impactor 80 the formation of urea deposits is reduced significantly.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer for a vehicle exhaust system comprising:
an outer shell having an inlet end and an outlet end;
an upstream baffle positioned adjacent the inlet end to initiate swirling of engine exhaust gases, wherein that upstream baffle comprises a plate having a plurality of inlet openings with at least one inlet opening of the plurality of inlet openings being larger than the remaining inlet openings;
a downstream baffle positioned adjacent the outlet end; and
an impactor extending between the upstream and downstream baffles, the impactor being spaced radially inwardly from an inner surface of the outer shell by a gap, and the impactor being positioned adjacent to the at least one inlet opening that is larger than the remaining inlet openings, and wherein the impactor comprises a wall that has a first edge and a second edge opposite the first edge, and wherein one of the first and second edges is fixed to a respective one of the upstream and downstream baffles, and wherein the other of the first and second edges is free to move relative to the respective other of the upstream and downstream baffles to accommodate thermal expansion.

2. The mixer according to claim 1 wherein the gap is within a range of 10 to 15 millimeters.

3. The mixer according to claim 1 wherein the outer shell defines a central axis extending along a length of the mixer, and wherein the impactor comprises an arcuate wall that is defined by a circumferential length that extends to at least partially surround the central axis.

4. The mixer according to claim 3 wherein the arcuate wall extends 360 degrees around the central axis.

5. The mixer according to claim 3 wherein the arcuate wall is positioned adjacent to a radially outward edge of the at least one inlet opening.

6. The mixer according to claim 5 wherein the arcuate wall surrounds less than 180 degrees of the central axis.

7. A mixer for a vehicle exhaust system comprising:
an outer shell having an inlet end and an outlet end, wherein the outer shell defines a central axis extending along a length of the mixer;
an upstream baffle positioned adjacent the inlet end to initiate swirling of engine exhaust gases;
a downstream baffle positioned adjacent the outlet end; and
an impactor extending between the upstream and downstream baffles, the impactor being spaced radially inwardly from an inner surface of the outer shell by a gap, and wherein the impactor comprises an arcuate wall that is defined by a circumferential length that extends to at least partially surround the central axis, and wherein the arcuate wall has an upstream edge adjacent the upstream baffle and a downstream edge adjacent the downstream baffle, and wherein one of the upstream and downstream edge is fixed to a respective one of the upstream and downstream baffles, and wherein the other of the upstream and downstream edge is movable relative to the respective other of the upstream and downstream baffles in order to accommodate thermal expansion.

8. The mixer according to claim 1 wherein the gap forms an isolation channel between the outer shell and the impactor, and wherein the plurality of inlet holes includes at least one first hole that directs engine exhaust gases into the isolation channel.

9. The mixer according to claim 8 including a first deflector portion formed adjacent an edge of the at least one first hole to direct the engine exhaust gases against an outer peripheral wall of the impactor.

10. The mixer according to claim 8 wherein the plurality of inlet holes includes at least one second hole adjacent an inner peripheral surface of the impactor, and wherein the upstream baffle includes a second deflector portion formed adjacent an edge of the at least one second hole to direct the engine exhaust gases against the inner peripheral surface of the impactor.

11. A vehicle exhaust system comprising:
a first exhaust component having an inlet to receive engine exhaust gases;
a second exhaust component positioned downstream of the first exhaust component; and
a mixer positioned downstream of the first component and upstream of the second exhaust component, the mixer having an inlet end configured to receive engine exhaust gases exiting the first exhaust component and an outlet end to direct swirling engine exhaust gas to the second exhaust component, the mixer including
an outer shell extending from the inlet end to the outlet end, wherein that upstream baffle comprises a plate having a plurality of inlet openings with at least one inlet opening of the plurality of inlet openings being larger than the remaining inlet openings,
an upstream baffle positioned adjacent the inlet end to initiate swirling of engine exhaust gases,
a downstream baffle positioned adjacent the outlet end, and
a wall extending between the upstream and downstream baffles, the wall having an outer peripheral surface that is spaced radially inwardly from an inner surface of the outer shell by a gap, and the wall being positioned adjacent to the at least one inlet opening that is larger than the remaining inlet openings, and wherein the wall has first edge and second edge opposite the first edge, and wherein one of the first and second edges is fixed to a respective one of the upstream and downstream baffles, and wherein the other of the first and second edges is free to move relative to the respective other of the upstream and downstream baffles to accommodate thermal expansion.

12. The vehicle exhaust system according to claim 11 including an injector that sprays a reducing agent into the mixer, the injector being mounted to the outer shell downstream of the at least one inlet opening of the plurality of inlet openings that is larger than the remaining inlet openings.

13. The vehicle exhaust system according to claim 11 wherein the outer shell defines a central axis extending along a length of the mixer, and wherein the wall comprises an arcuate wall that is defined by a circumferential length that extends to at least partially surround the central axis.

14. A vehicle exhaust system comprising:
a first exhaust component having an inlet to receive engine exhaust gases;
a second exhaust component positioned downstream of the first exhaust component; and
a mixer positioned downstream of the first component and upstream of the second exhaust component, the mixer having an inlet end configured to receive engine exhaust gases exiting the first exhaust component and an outlet end to direct swirling engine exhaust gas to the second exhaust component, the mixer including
an outer shell extending from the inlet end to the outlet end, wherein the outer shell defines a central axis extending along a length of the mixer,
an upstream baffle positioned adjacent the inlet end to initiate swirling of engine exhaust gases,
a downstream baffle positioned adjacent the outlet end, and
a wall extending between the upstream and downstream baffles, the wall having an outer peripheral surface that is spaced radially inwardly from an inner surface of the outer shell by a gap, and wherein the wall comprises an arcuate wall that is defined by a circumferential length that extends to at least partially surround the central axis, and wherein the arcuate wall has an upstream edge adjacent the upstream baffle and an downstream edge adjacent the downstream baffle, and wherein one of the upstream and downstream edge is fixed to a respective one of the upstream and downstream baffles, and wherein the other of the upstream and downstream edge is movable relative to the respective other of the upstream and downstream baffles in order to accommodate thermal expansion.

15. The vehicle exhaust system according to claim 11 wherein the gap forms an isolation channel between the outer shell and the wall, and wherein the plurality of inlet openings includes at least one first hole that directs engine exhaust gases into the isolation channel.

16. The vehicle exhaust system according to claim 15 including a first deflector portion formed adjacent an edge of the at least one first hole to direct the engine exhaust gases against the outer peripheral surface of the wall.

17. The vehicle exhaust system according to claim 15 wherein the plurality of inlet openings includes at least one second hole adjacent an inner peripheral surface of the wall, and wherein the upstream baffle includes a second deflector portion formed adjacent an edge of the at least one second hole to direct the engine exhaust gases against the inner peripheral surface of the wall.

18. The vehicle exhaust system according to claim 11 wherein the first exhaust component comprises at least one of a diesel oxidation catalyst and a particulate filter, and wherein the downstream component comprises a selective catalytic reduction catalyst.

19. The vehicle exhaust system according to claim 11 wherein the downstream component comprises a catalyst which combines selective catalyst reduction and particulate filter functions.

20. A vehicle exhaust system comprising:
a first exhaust component having an inlet to receive engine exhaust gases;
a second exhaust component positioned downstream of the first exhaust component; and
a mixer positioned downstream of the first component and upstream of the second exhaust component, the mixer having an inlet end configured to receive engine exhaust gases exiting the first exhaust component and an outlet end to direct swirling engine exhaust gas to the second exhaust component, the mixer including
an outer shell extending from the inlet end to the outlet end, wherein that upstream baffle comprises a plate having a plurality of inlet openings with at least one inlet opening of the plurality of inlet openings being larger than the remaining inlet openings,
an upstream baffle positioned adjacent inlet end to initiate swirling of engine exhaust gases,
a downstream baffle positioned adjacent the outlet end, and
a wall extending between the upstream and downstream baffles, the wall having an outer peripheral surface that is spaced radially inwardly from an inner surface of the outer shell by a gap, and the wall being positioned adjacent to the at least one inlet opening that is larger than the remaining inlet openings, and wherein the gap forms an isolation channel between the outer shell and the wall, and wherein the plurality of inlet openings includes at least one first hole that directs engine exhaust gases into the isolation channel
wherein the plurality of inlet openings includes at least one second hole adjacent an inner peripheral surface of the wall, and wherein the upstream baffle includes a second deflector portion formed adjacent an edge of the at least one second hole to direct the engine exhaust gases against the inner peripheral surface of the wall; and
wherein the at least one first hole comprises a plurality of first holes with a plurality of first deflector portions to direct the engine exhaust gases against an outer peripheral surface of the wall, and wherein the at least one second hole comprises a plurality of second holes that are spaced radially inward of the plurality of first holes, and wherein distal ends of the first and second deflector portions extend towards each other.

21. A mixer for a vehicle exhaust system comprising:
an outer shell having an inlet end and an outlet end;
an upstream baffle positioned adjacent the inlet end to initiate swirling of engine exhaust gases, wherein the upstream baffle comprises a plate having a plurality of inlet openings with at least one inlet opening of the plurality of inlet openings being larger than the remaining inlet openings;
a downstream baffle positioned adjacent the outlet end; and
an impactor extending between the upstream and downstream baffles, the impactor being spaced radially inwardly from an inner surface of the outer shell by a gap, and the impactor being positioned adjacent to the at least one inlet opening that is larger than the remaining inlet openings, and wherein the gap forms an isolation channel between the outer shell and the impactor, and wherein the plurality of inlet holes includes at least one first hole that directs engine exhaust gases into the isolation channel;

wherein the plurality of inlet holes includes at least one second hole adjacent an inner peripheral surface of the impactor, and wherein the upstream baffle includes a second deflector portion formed adjacent an edge of the at least one second hole to direct the engine exhaust gases against the inner peripheral surface of the impactor; and wherein the at least one first hole comprises a plurality of first holes with a plurality of first deflector portions to direct the engine exhaust gases against an outer peripheral wall of the impactor, and wherein the at least one second hole comprises a plurality of second holes that are spaced radially inward of the plurality of first holes, and wherein distal ends of the first and second deflector portions extend towards each other.

\* \* \* \* \*

UNITED STATES PATENT AND TRADEMARK OFFICE
CERTIFICATE OF CORRECTION

PATENT NO.         : 9,581,067 B2
APPLICATION NO.    : 14/431340
DATED              : February 28, 2017
INVENTOR(S)        : Frederic Guilbaud, Philip M. Dimpelfeld and Eduardo Alano It is certified that error appears in the above-identified patent and that said Letters Patent is hereby corrected as shown below:

In the Claims

In Claim 11, Column 6, Line 51; before "upstream" replace "that" with --an--

In Claim 11, Column 6, Line 55; before "upstream" replace "an" with --the--

In Claim 20, Column 8, Line 20; before "upstream" replace "that" with --an--

In Claim 20, Column 8, Line 24; before "upstream" replace "an" with --the--

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*